United States Patent [19]

Meier

[11] Patent Number: 4,583,829
[45] Date of Patent: Apr. 22, 1986

[54] EDGE SUPPORTING SYSTEM FOR A TELESCOPE MIRROR

[75] Inventor: Hans-Jürgen Meier, Aalen, Fed. Rep. of Germany

[73] Assignee: Carl-Zeiss-Stiftung, Heidenheim, Fed. Rep. of Germany

[21] Appl. No.: 593,549

[22] Filed: Mar. 26, 1984

[30] Foreign Application Priority Data

Apr. 13, 1983 [DE] Fed. Rep. of Germany ....... 3313324

[51] Int. Cl.⁴ .............................................. G02B 7/18
[52] U.S. Cl. .................................................. 350/609
[58] Field of Search ....................... 350/607, 609, 611

[56] References Cited

U.S. PATENT DOCUMENTS 3,063,343 11/1962 Kaestner ............................ 350/609
4,299,445 11/1981 Aneouturier ........................ 350/609

OTHER PUBLICATIONS

"Applied Optics", vol. 21, #14, Jul. 82.

Primary Examiner—Jon W. Henry
Attorney, Agent, or Firm—Walter Ottesen

[57] ABSTRACT

The invention is directed to an edge supporting system that is especially suited for an azimuthally mounted mirror. In this system, the supporting forces are all arranged to be parallel to the projection of the gravity force in the plane of the mirror. The magnitudes of the supporting forces are reduced with increasing distance of the force application points from the upper and lower apex points of the mirror. The supporting forces are preferably so selected that they correspond to the weights of the strip-like segments from which the mirror is assembled and to which points of force application are assigned.

5 Claims, 5 Drawing Figures

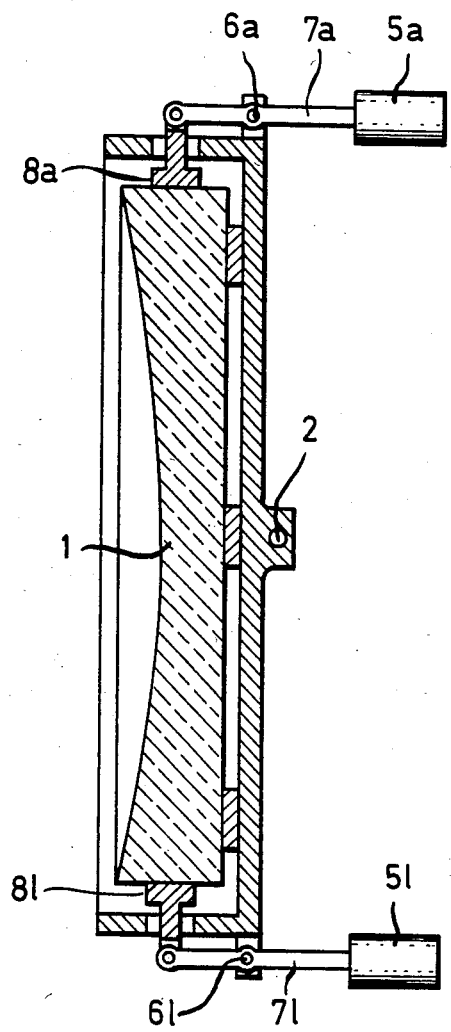

EDGE SUPPORTING SYSTEM FOR A TELESCOPE MIRROR

FIELD OF THE INVENTION

The invention relates to an edge supporting system particularly for a telescope mirror to take up the weight components which are perpendicular to the optical axis of the mirror.

BACKGROUND OF THE INVENTION

The optical imaging quality of large telescope mirrors is substantially affected because they tend to deform under their own weight. In configuring an edge supporting system, one therefore strives to minimize deformations of the mirror in the direction of its axis by selecting a suitable distribution of supporting forces. Such deformations have an intense effect on the imaging quality of the mirror. The influence of different supporting force distributions on the deformation of a large telescope mirror are described, for example, in "Applied Optics, Volume 7, Number 6", pages 1207 to 1212, June 1968.

In edge supporting systems which have been realized to date, the supporting forces are always radial forces, that is, forces which are directed toward the center point of the mirror whereby the totality of the supporting forces are viewed as being especially advantageous as a cosine-like distribution in the form of thrust or push forces on the lower half of the mirror and tension or pull forces on the upper half thereof. As a practical matter, the supporting forces are, as a rule, applied through a system of counterweights arranged uniformly on the periphery of the mirror. These forces act on the peripheral edge of the mirror via levers as explained, for example, in No. DE-OS 24 14 266. In this connection, the cosine supporting force distribution results from the arrangement of the pivot axes of the levers tangential to the edge of the mirror.

In addition, No. DE-OS 29 03 804 teaches that a tangential supporting force distribution with a sine-like envelope of the magnitudes of forces can be superimposed upon the radially directed supporting force distribution with a cosine-like envelope. This leads to the condition that the resultants of the forces acting on the edge of the mirror all act in the direction of the projection of the gravity force in the mirror plane and have the same magnitude. In this known edge supporting system, the supporting forces are applied in an embodiment which is especially suitable for parallactic assembly by means of counterweights on levers which are pivotable simultaneously about two orthogonal axes. The realization of such a lever system requires a relatively high expenditure.

SUMMARY OF THE INVENTION

It is an object of the invention to provide an edge supporting system which leads to a further reduction of mirror deformation. This edge supporting system is especially suitable for azimuthally mounted telescopes and is of especially simple configuration.

The above object is realized in the system according to the invention by providing that the forces $F_{gi}$ and the spacing $a_i$ of the supporting forces are so selected that the quotient $F_{gi}/a_i$ of both quantities becomes smaller with increasing distance of the points of force application from the upper and lower apex points of the mirror.

In this connection, it is suitable that the magnitudes $F_{gi}$ of the supporting forces are so selected that they correspond to the weights of the strip-like segments $M_{gi}$ of the mirror to which the points of force application are assigned.

The latter is not absolutely necessary; rather, solutions can be also shown to be advantageous wherein the magnitudes of the supporting forces deviate from the values obtained by the last-mentioned requirement by a factor dependent upon their angular position.

In an edge supporting system configured according to the invention, the axial deformations of the mirror are significantly smaller than with the state-of-the-art systems referred to above.

Furthermore, if the mirror to be supported is mounted azimuthally, then the supporting forces can be applied via levers and counterweights wherein a journalling of the lever on only a single axis is required.

It is suitable to distribute the supporting forces at equal intervals about the periphery of the mirror. In this situation, beginning at the apex points of the mirror, counterweights are applied having respective masses that become less when proceeding toward the right and left sides of the mirror. However, in lieu thereof, with increasing distance toward the sides of the mirror, it is also possible to increase the spacings between the points at which supporting forces act on the edge of the mirror; or, to combine both measures, namely: reduce the masses and increase the spacings.

BRIEF DESCRIPTION OF THE DRAWING

The invention will now be described with reference to the drawing wherein.

DESCRIPTION OF THE PREFERRED EMBODIMENTS OF THE INVENTION

Figure 1:
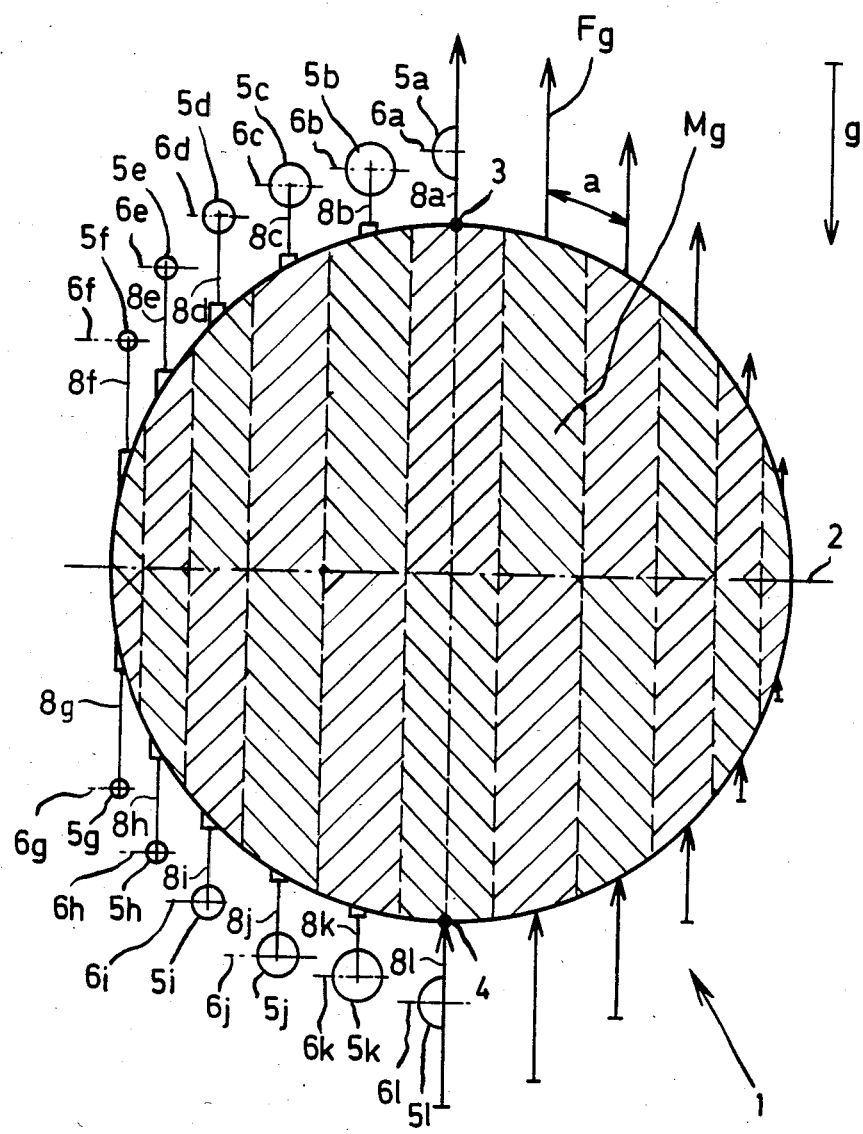
FIG. 1 is a concept schematic emphasizing the distribution of supporting forces in an edge supporting system according to the invention.

Referring to FIG. 1, reference numeral 1 designates the telescope mirror which is azimuthally mounted and is therefore pivotable about its horizontal axis 2. The mirror 1 is pivotally moved to a position wherein its optical axis extends horizontally. The arrows $F_{gi}$ drawn in the righthand half of the mirror are either directed toward the edge thereof or are directed away therefrom. The arrows $F_{gi}$ represent the forces applied by the edge supporting system of the invention to the mirror 1. These forces act parallel to the direction of the projection of the gravity force g in the plane of the mirror. The magnitudes of the forces $F_{gi}$ are so selected that they correspond to the weights $M_{gi}$ of the segments, respectively, of which the mirror is made up. These segments are of strip-like configuration and each strip includes two hatched segment portions as shown. The segment portions are assigned to points to which the forces are applied. The sum of all forces $F_{gi}$ in magnitude is therefore equal in magnitude to the total weight of the mirror 1 when the mirror 1 is in the vertical position.

The forces $F_{gi}$ are applied to the edge of the mirror by means of a conventional system of counterweights $5a$ to $5l$ each of which applies a thrust force or a tension force to the edge of the mirror via a two-arm lever. The two-arm levers associated with counterweights $5a$ and $5l$ are shown in FIG. 5 and are indicated by reference designations $7a$ and $7l$. The levers corresponding to counterweights $5a$ to $5l$ act on the mirror by via members identified in FIG. 1 by reference designations $8a$ to $8l$. This is sketched in FIG. 1 for the lefthand side of the mirror. The levers with their counterweights $5a$ to $5l$ are pivotally journalled about axes $6a$ to $6l$ on the supporting structure of the mirror 1 as shown in FIG. 5. These axes $6a$ to $6l$ are all arranged parallel to the elevation axis 2 of the mirror 1. In the embodiment of FIG. 1 wherein an equidistant arrangement of counterweights is provided, the masses of these counterweights are ever decreasing in a direction from the apex points 3 and 4 of the mirror 1 to its edges.

Figure 4:
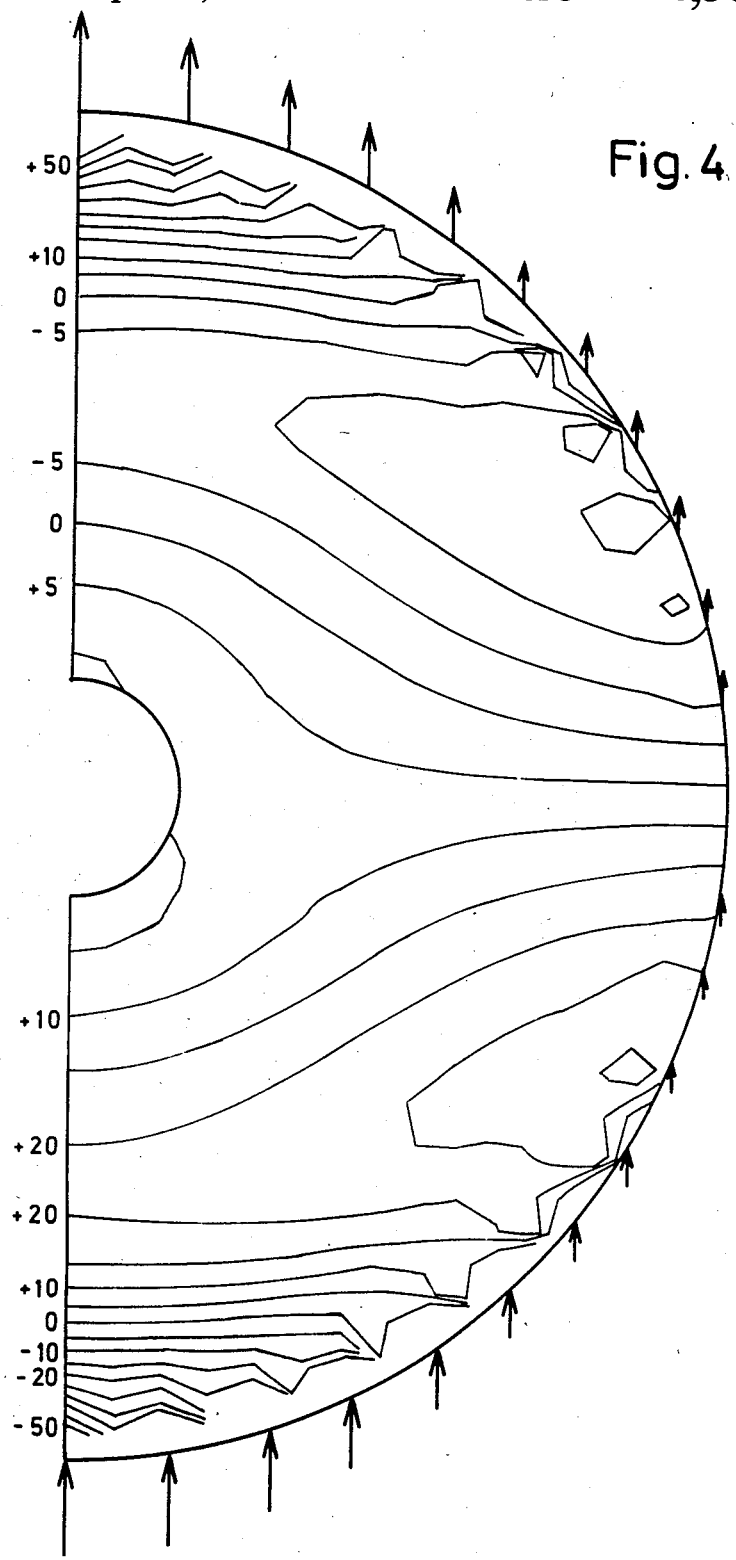
FIG. 4 is a simulation of the deformation of a telescope mirror having an edge supporting system according to the invention; and, FIG. 5 is a side elevation view of the telescope mirror held in a supporting structure.

FIG. 4 is a graphical illustration of the deformation of a mirror, journalled as shown in FIG. 1, in the direction of its optical axis as a result of a computation according to the method of finite elements. The lines which are drawn in are contour lines having an axial spacing of 5 nm. The computation was based on a mirror of Zerodur with a diameter of d=3 m, a central opening of 46 cm and a thickness of 25 cm. Zerodur is a ceramic material, having a low thermal coefficient of expansion and is available from Glaswerke Schott U. Gen., a corportation organized and existing under the laws of the Federal Republic of Germany. The supporting forces are applied at forty-two locations distributed about the periphery of the mirror. Because of symmetry, only the right half of the mirror is shown. In the region of the edge of the mirror, the contour lines are omitted to provide clarity.

The mean value of all deformations of the mirror in the direction of its axis amounts to 38.4 nm for the computation of this example. This is a very good value for an astronomical mirror of this size.

To compare this mean value with the value of mirrors equipped with a conventional edge supporting system, the deformation of a mirror was computed having an edge supporting system, although deviating from the example shown in FIG. 4, intended as a pure radial supporting force distribution with the magnitudes of the supporting forces defining a cosine-like envelope. Again, forty-two discrete points were likewise selected at which the supporting forces are applied.

Figure 2:
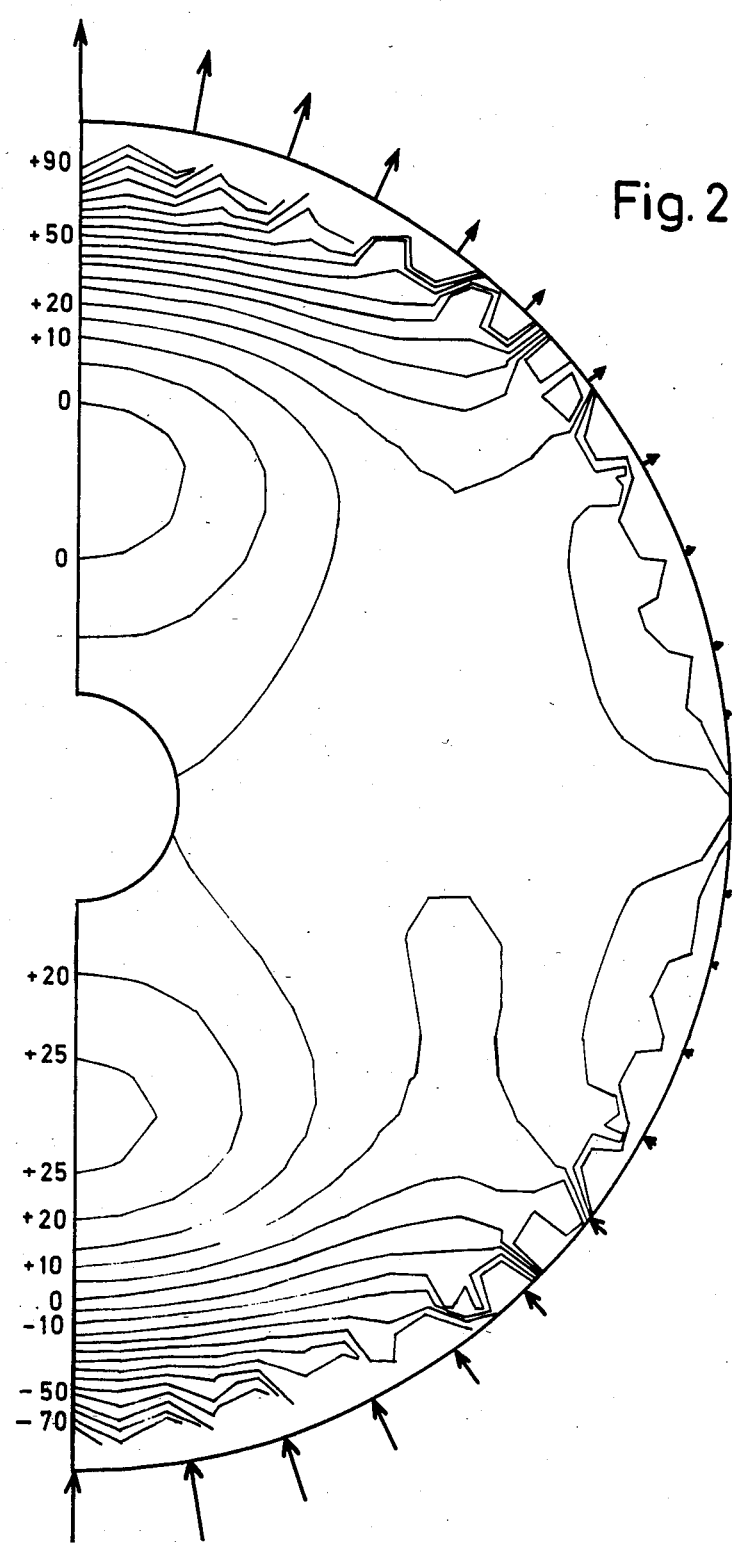
FIG. 2 is a simulation of the deformation of a telescope mirror with a conventional edge supporting system.

The result is shown in FIG. 2. The mean value of all deformations amounts here to 53.4 nm and is therefore significantly worse than the example of FIG. 4 computed according to the invention.

Figure 3:
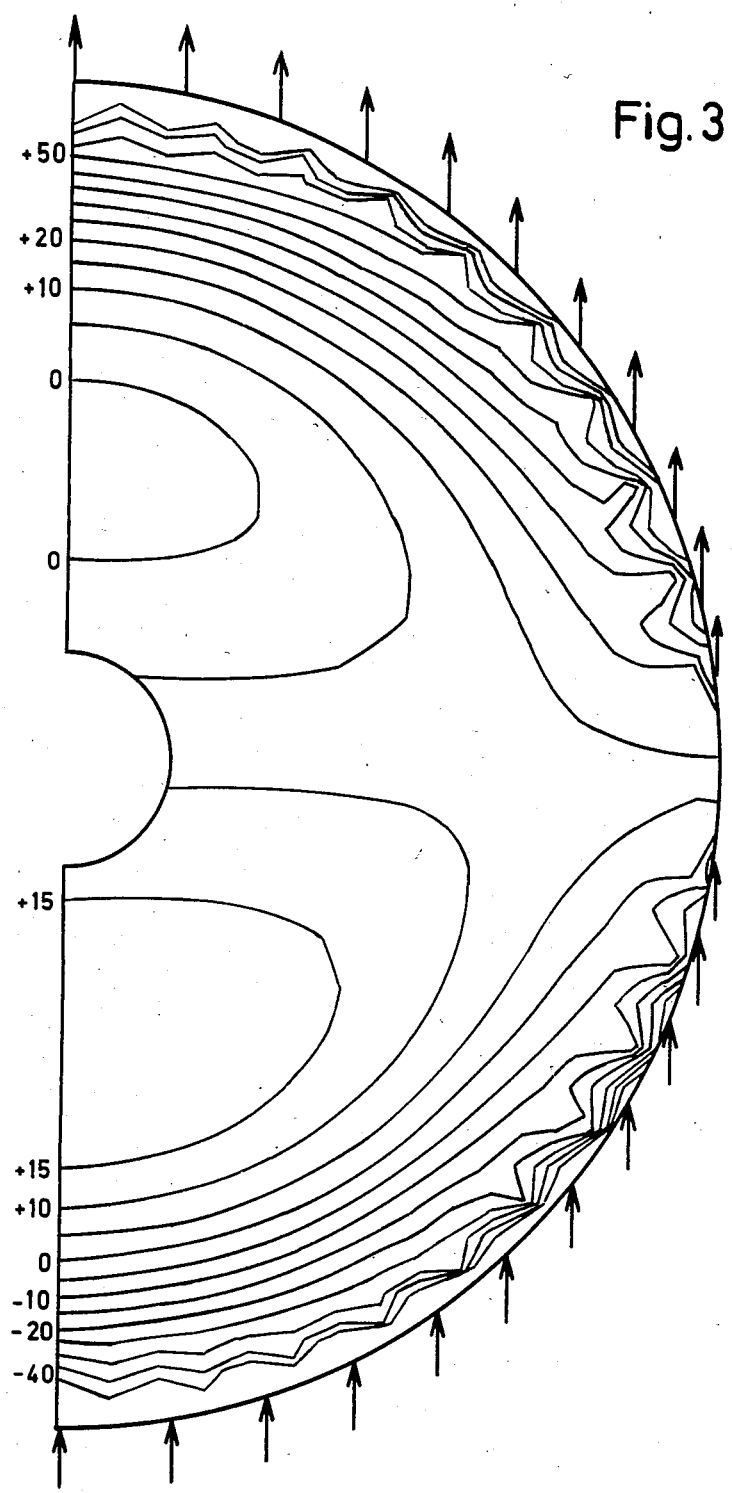
FIG. 3 is a simulation of the deformation of a telescope mirror with an edge supporting system according to No. DE-OS 29 03 804.

For the sake of completeness, a third example was computed for which a supporting force distribution was assumed corresponding to the system suggested in No. DE-OS 29 03 804, that is, radial and tangential supporting forces were assumed whose resultants are directed in a direction parallel to the projection of the gravity force in the plane of the mirror and have everywhere the same magnitudes (FIG. 3).

The deformation of a mirror journalled in this manner is less than in the example of FIG. 2 and lies, however, with a mean value of 44.6 nm significantly over the mirror of embodiment of FIG. 4 journalled according to the invention.

It is understood that the foregoing description is that of the preferred embodiments of the invention and that various changes and modifications may be made thereto without departing from the spirit and scope of the invention as defined in the appended claims.

What is claimed is:

1. In an arrangement for mounting a telescope mirror having an optical axis and upper and lower apex points along its peripheral edge, the mirror defining a mirror plane and having components of weight perpendicular to the optical axis, an edge supporting system for taking up said components of weight, the system comprising:

edge support means for applying a plurality of supporting forces to the edge of the mirror at respective predetermined force application points thereon so as to cause said forces to act in a direction substantially parallel to the projection of the direction of the gravity force in said mirror plane; and, the magnitude quantities $F_{gi}$ of said supporting forces and the respective spacing quantities $a_i$ between each two adjacent ones of said supporting forces being selected so as to cause the quotient $F_{gi}/a_i$ of said quantities to become smaller with increasing distance of said force application points from said upper and lower apex points.

2. The system of claim 1, wherein the mirror is made up of a plurality of strip-like segments $M_{gi}$ one next to the other and wherein said segments are assigned to corresponding ones of said force application points, said magnitude quantities $F_{gi}$ of the supporting forces being selected so that they correspond substantially to the weights of said segments, respectively.

3. The system of claim 2, wherein said supporting forces are distributed about the periphery of the mirror so as to be equally spaced one from the other.

4. The system of claim 3, wherein the system is applied to support an azimuthally mounted telescope mirror, said mirror having an elevation axis and being mounted so as to be pivotable about said elevation axis.

5. The system of claim 4, wherein said edge support means includes a plurality of lever assemblies corresponding to said supporting forces, respectively, each of said lever assemblies including:

lever means mounted so as to be pivotable about an axis parallel to said elevation axis, said lever means having a first arm and a second arm; and, a counterweight suspended from said first arm and said second arm being disposed so as to act on the peripheral edge of the mirror.

* * * * *